United States Patent
Matsumura et al.

(10) Patent No.: US 11,750,429 B2
(45) Date of Patent: Sep. 5, 2023

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 78 days.

(21) Appl. No.: 16/970,139

(22) PCT Filed: Feb. 15, 2018

(86) PCT No.: PCT/JP2018/005335
§ 371 (c)(1),
(2) Date: Aug. 14, 2020

(87) PCT Pub. No.: WO2019/159292
PCT Pub. Date: Aug. 22, 2019

(65) Prior Publication Data
US 2020/0403835 A1    Dec. 24, 2020

(51) Int. Cl.
*H04B 1/713* (2011.01)
*H04L 27/26* (2006.01)
(Continued)

(52) U.S. Cl.
CPC ......... *H04L 27/2607* (2013.01); *H04B 1/713* (2013.01); *H04W 72/21* (2023.01); *H04W 72/23* (2023.01)

(58) Field of Classification Search
CPC ..... H04B 1/713; H04L 5/0012; H04L 5/0092; H04L 5/0094; H04W 72/0413; H04W 72/042; H04W 72/1284
See application file for complete search history.

(56) References Cited

U.S. PATENT DOCUMENTS

2009/0290538 A1    11/2009    Kim et al.
2014/0133373 A1*    5/2014    Han .................. H04L 5/0055
                                                          370/329
(Continued)

FOREIGN PATENT DOCUMENTS

| EP | 2928089 A1 | 10/2015 |
| JP | 2011523248 A | 8/2011 |
| JP | 2016508302 A | 3/2016 |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Bo Hui A Zhu
(74) *Attorney, Agent, or Firm* — Osha Bergman Watanabe & Burton LLP

(57) ABSTRACT

A terminal is disclosed including a receiver that receives a downlink control information; and a processor that determines a first parameter based on a control channel element (CCE) index and a field value in the downlink control information; determines, based on the CCE index, whether a second parameter is the first parameter or a sum of the first parameter and an offset; and determines an initial cyclic shift index for a physical uplink control channel (PUCCH) transmission based on the second parameter. In other aspects, a communication method for a terminal and a base station are disclosed.

7 Claims, 15 Drawing Sheets

(51) Int. Cl.
*H04W 72/21* (2023.01)
*H04W 72/23* (2023.01)

(56) References Cited

U.S. PATENT DOCUMENTS

2020/0403835 A1* 12/2020 Matsumura ........... H04L 5/0053
2021/0143948 A1*  5/2021 Choi .................... H04L 5/0012

OTHER PUBLICATIONS

International Search Report issued in International Application No. PCT/JP2018/005335, dated Apr. 24, 2018 (5 pages).
Written Opinion issued in International Application No. PCT/JP2018/005335; dated Apr. 24, 2018 (3 pages).
Extended European Search Report issued in counterpart European Application No. 18906189.8 dated Aug. 31, 2021 (9 pages).
CATT; "PUCCH resource allocation"; 3GPP TSG RAN WG1 Meeting AH 1801, R1-1800256; Vancouver, Canada, Jan. 22-26, 2018 (5 pages)
OPPO; "Summary of offline discussions on PUCCH resource allocation"; 3GPP TSG RAN WG1 Meeting AH 1801, R1-1801152; Vancouver, Canada, Jan. 22-26, 2018 (10 pages).
Office Action issued in the counterpart Korean Patent Application No. 10-2020-7025074, dated Nov. 25, 2022 (8 pages).

* cited by examiner

| FIRST FIELD IN FIRST DCI | PUCCH RESOURCE INDICATOR |
|---|---|
| 00 | 0 |
| 01 | 1 |
| 10 | 2 |
| 11 | 3 |

| SECOND FIELD IN SECOND DCI | TPC COMMAND | IMPLICIT VALUE |
|---|---|---|
| 00 | −1 | 0 |
| 01 | 0 | 1 |
| 10 | +1 | 0 |
| 11 | +3 | 1 |

FIG. 2

| FIRST FIELD IN FIRST DCI | PUCCH RESOURCE INDICATOR |
|---|---|
| 00 | 0 |
| 01 | 1 |
| 10 | 2 |
| 11 | 3 |

| SECOND FIELD IN SECOND DCI | TPC COMMAND | FIRST IMPLICIT VALUE | SECOND IMPLICIT VALUE |
|---|---|---|---|
| 00 | -1 | 0 | 0 |
| 01 | 0 | 1 | 0 |
| 10 | +1 | 0 | 1 |
| 11 | +3 | 1 | 1 |

FIG. 3

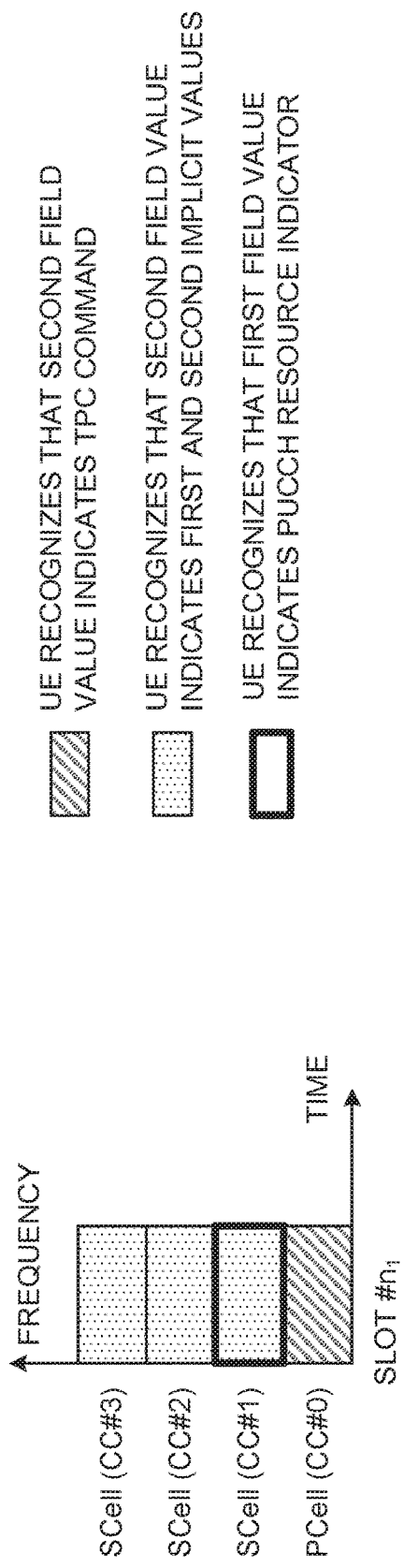
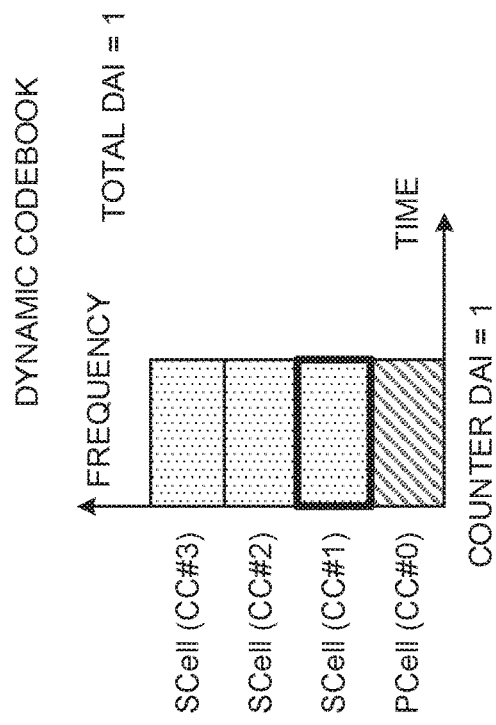
FIG. 6A / FIG. 6B

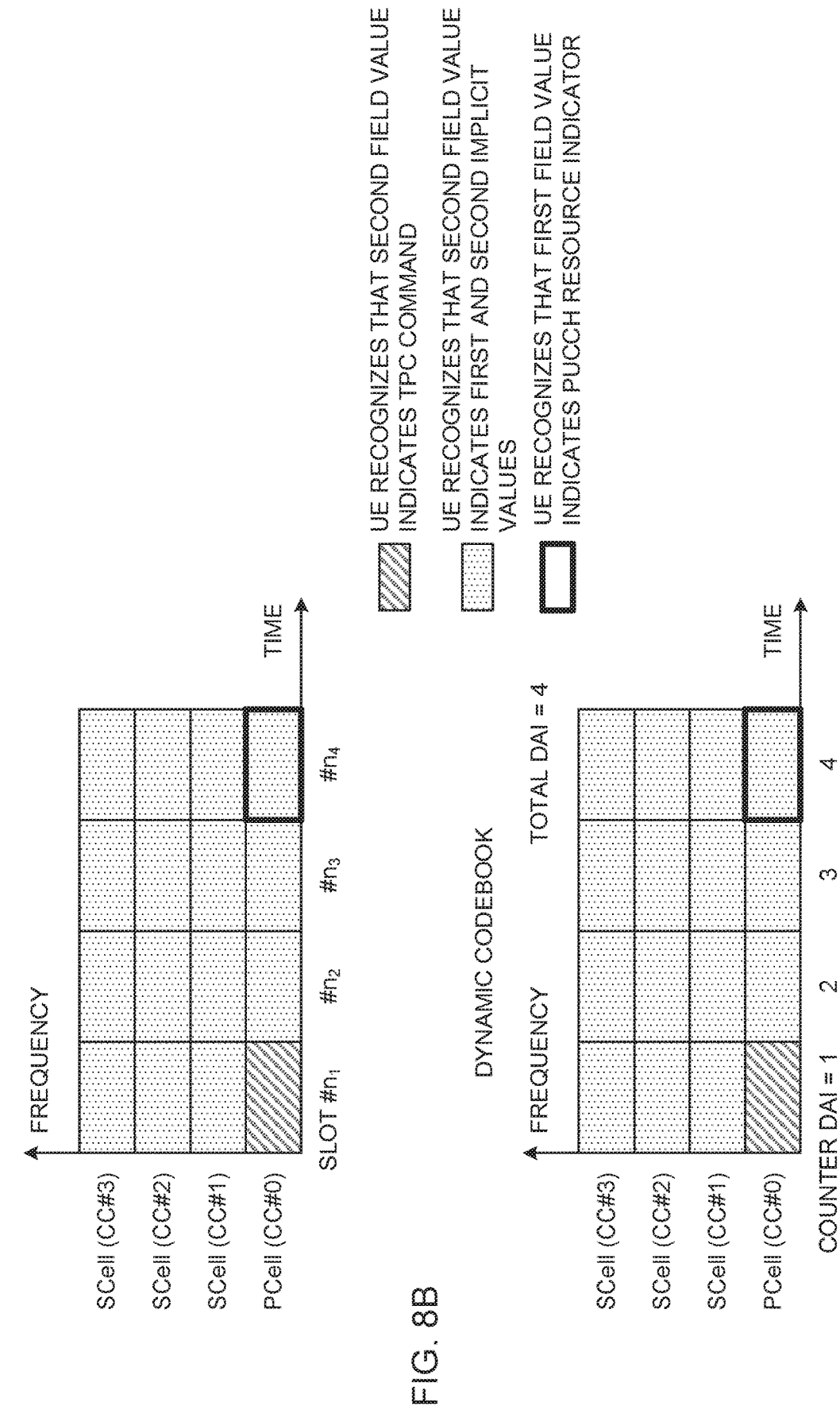

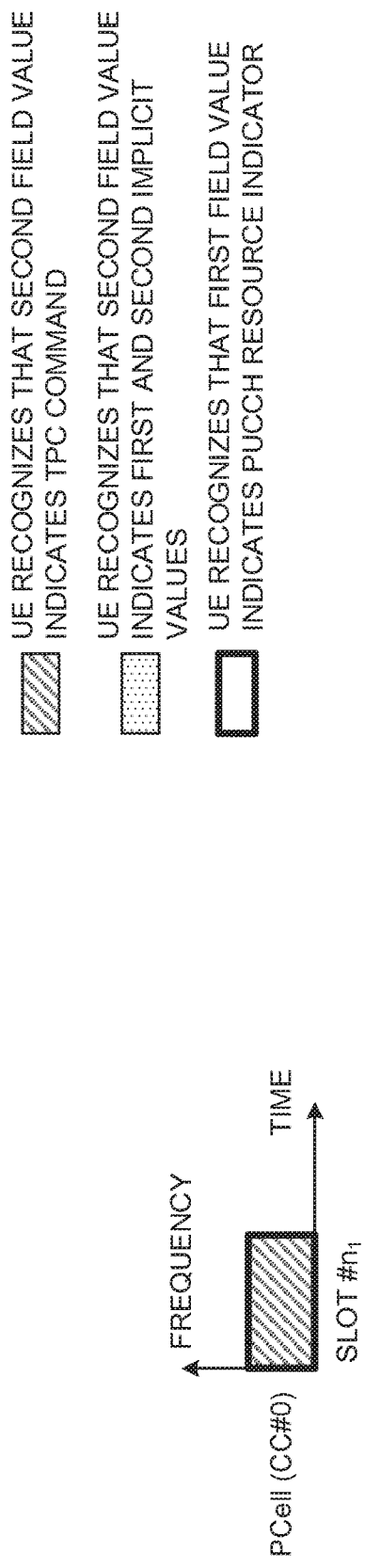
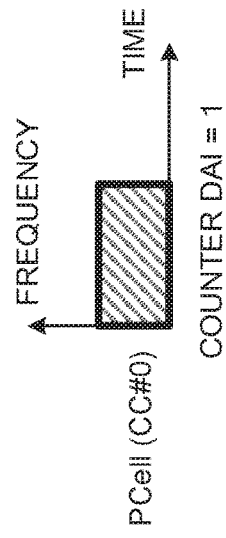
FIG. 9A
FIG. 9B

TERMINAL, RADIO COMMUNICATION METHOD, AND BASE STATION

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE-Advanced (LTE-A), Future Radio Access (FRA), 4G, 5G, 5G+ (plus), New RAT (NR) or LTE Rel. 14 or 15~) have been also studied.

Legacy LTE systems (e.g., LTE Rel. 8 to 13) perform communication on Downlink (DL) and/or Uplink (UL) by using a subframe (also referred to as, for example, Transmission Time Intervals (TTIs)) of 1 ms. The subframe is a transmission time unit of 1 channel-coded data packet, and is a processing unit of scheduling, link adaptation and retransmission control (HARQ: Hybrid Automatic Repeat reQuest).

Furthermore, in the legacy LTE systems (e.g., LTE Rel. 8 to 13), a user terminal transmits Uplink Control Information (UCI) by using an uplink control channel (e.g., PUCCH: Physical Uplink Control Channel) or an uplink shared channel (e.g., PUSCH: Physical Uplink Shared Channel). A configuration (format) of the uplink control channel will be referred to as, for example, a PUCCH format.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for future radio communication systems (e.g., LTE Rel. 15 or subsequent releases, 5G, 5G+ and NR) to determine resources (e.g., PUCCH resources) for an uplink control channel based on a higher layer signaling and a given field value in Downlink Control Information (DCI) when transmitting UCI by using the uplink control channel (e.g., PUCCH).

For example, the future radio communication systems assume that, when one or more sets (PUCCH resource sets) each including one or more PUCCH resources are notified (configured) to a user terminal by a higher layer signaling, the user terminal determines PUCCH resources used for transmission of UCI based on a given field value in DCI from the PUCCH resource set selected based on a UCI payload size (the number of bits).

However, there is a risk that, when the PUCCH resource set selected based on a given rule (e.g., UCI payload size) includes a larger number of (e.g., M>4 in a case where the given field of the DCI is 2 bits) PUCCH resources than a number that can be indicated by the given field of the DCI, the user terminal cannot appropriately determine the PUCCH resources used for the transmission of the UCI.

The present invention has been made in light of this point, and one of objects of the present invention is to provide a user terminal and a radio communication method that can appropriately determine PUCCH resources used for transmission of UCI.

Solution to Problem

One aspect of a user terminal according to the present invention includes: a transmission section that transmits Uplink Control Information (UCI) by using an uplink control channel; and a control section that determines a resource used for the transmission of the UCI based on a resource indicator indicated by a first field value in first downlink control information, and a first implicit value and a second implicit value indicated by a second field value in second downlink control information.

Advantageous Effects of Invention

According to the present invention, it is possible to appropriately determine PUCCH resources used for transmission of UCI.

BRIEF DESCRIPTION OF DRAWINGS

FIG. 2 is a diagram illustrating one example of determination of the PUCCH resources.

FIG. 3 is a diagram illustrating one example of determination of PUCCH resources according to a first aspect.

FIGS. 6A and 6B are diagrams illustrating a first example of pieces of first and second DCI according to a third aspect.

FIGS. 8A and 8B are diagrams illustrating a third example of the pieces of first and second DCI according to the third aspect.

FIGS. 9A and 9B are diagrams illustrating a fourth example of the pieces of first and second DCI according to the third aspect.

DESCRIPTION OF EMBODIMENTS

Figure 1:
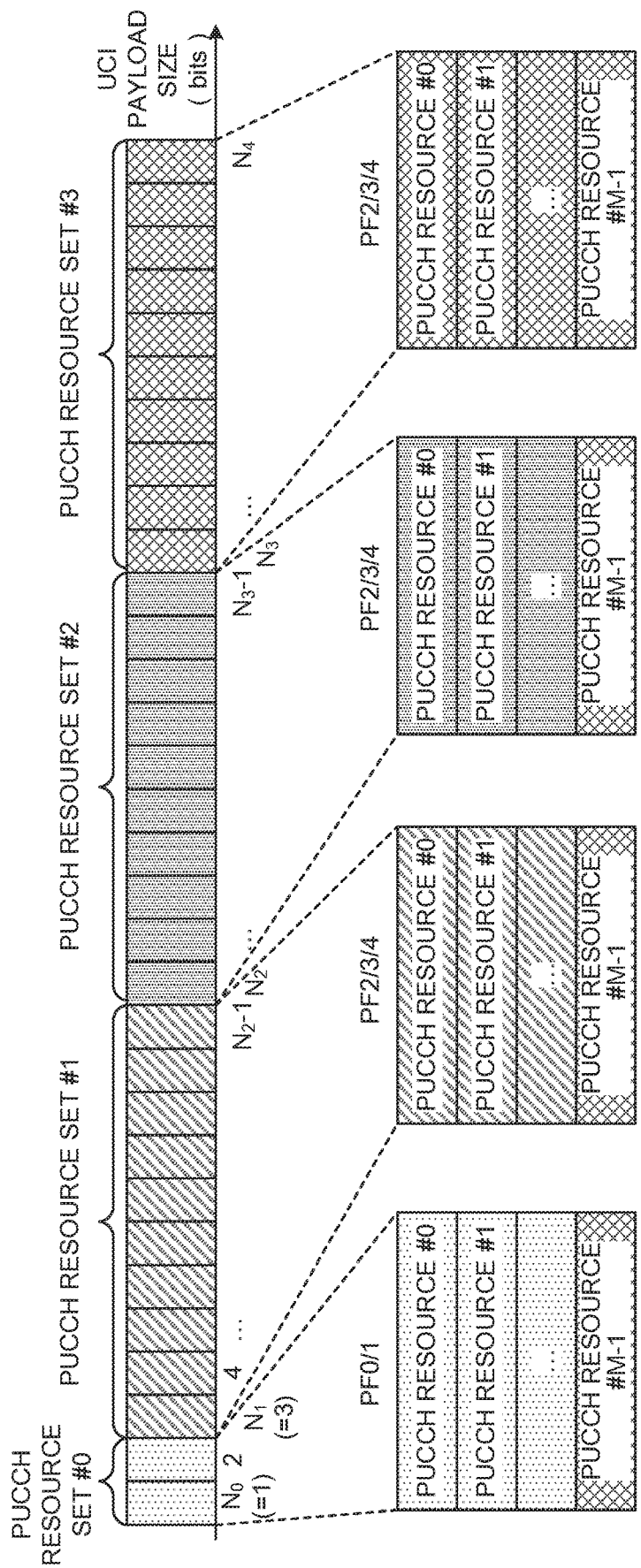
FIG. 1 is a diagram illustrating one example of allocation of PUCCH resources.

For a future radio communication system (e.g., LTE Rel. 15-, 5G or NR), a configuration (also referred to as, for example, a format or a PUCCH Format (PF)) for an uplink control channel (e.g., PUCCH) used for transmission of UCI has been studied. For example, it has been studied for LTE Rel. 15 to support 5 types of PFs 0 to 4. In this regard, names of PFs described below are only exemplary, and different names may be used.

For example, the PFs 0 and 1 are PFs that are used for transmission of UCI (e.g., transmission acknowledgement information (also referred to as, for example, HARQ-ACK: Hybrid Automatic Repeat reQuest-Acknowledge, ACK or NACK)) up to 2 bits. The PF 0 can be allocated to 1 or 2 symbols, and therefore will be also referred to as, for example, a short PUCCH or a sequence-based short PUCCH. On the other hand, the PF 1 can be allocated to 4 to 14 symbols, and therefore will be also referred to as, for example, a long PUCCH. According to the PF 1, a plurality of user terminals may be subjected to Code Division Multiplexing (CDM) in an identical PRB by time-domain block-wise spreading that uses at least one of, for example, a CS and an OCC.

The PFs 2 to 4 are PFs that are used for transmission of UCI (e.g., Channel State Information (CSI) (or CSI, and HARQ-ACK and/or a Scheduling Request (SR))) more than 2 bits. The PF 2 can be allocated to 1 or 2 symbols, and therefore will be also referred to as, for example, a short PUCCH. On the other hand, the PFs 3 and 4 can be allocated to 4 to 14 symbols, and therefore will be also referred to as, for example, a long PUCCH. According to the PF 3, a plurality of user terminals may be subjected to CDM by using (frequency-domain) block-wise spreading before DFT.

Resources (e.g., PUCCH resources) used for transmission of the uplink control channel are allocated by using a higher layer signaling and/or Downlink Control Information (DCI). In this regard, the higher layer signaling only needs to be at least one of, for example, a Radio Resource Control (RRC) signaling, system information (e.g., at least one of RMSI: Remaining Minimum System Information, OSI: Other System Information, an MIB: Master Information Block and an SIB: System Information Block), and broadcast information (PBCH: Physical Broadcast Channel).

More specifically, one or more sets (PUCCH resource sets) each including one or more PUCCH resources are notified (configured) to a user terminal by a higher layer signaling. For example, K (e.g., 1≤K≤4) PUCCH resource sets may be notified to the user terminal from a radio base station. Each PUCCH resource set may include M (e.g., 4≤K≤8) PUCCH resources.

The user terminal may determine a single PUCCH resource set from the K configured PUCCH resource sets based on a payload size of UCI (UCI payload size). The UCI payload size may be the number of bits of UCI that does not include a Cyclic Redundancy Code (CRC) bit.

The user terminal may determine PUCCH resources used for transmission of UCI from the M PUCCH resources included in the determined PUCCH resource set based on at least one of DCI and implicit information (also referred to as, for example, implicit indication information or an implicit index).

FIG. 1 is a diagram illustrating one example of allocation of PUCCH resources. FIG. 1 illustrates one example where K=4 holds, and four PUCCH resource sets #0 to #3 are configured from the radio base station to the user terminal by a higher layer signaling. Furthermore, the PUCCH resource sets #0 to #3 each include M (e.g., 4≤M≤8) PUCCH resources #0 to #M−1. In addition, the number of PUCCH resources included in each PUCCH resource set may be identical or may be different.

In FIG. 1, each PUCCH resource configured to the user terminal may include a value of at least one of following parameters (also referred to as, for example, fields or information). In addition, a range of a value that can be taken per PUCCH format may be defined for each parameter.

An index of a symbol (starting symbol index) from which PUCCH allocation is started The number of symbols (the number of PUCCH symbols) to be assigned to a PUCCH in a slot An index of a resource block (Physical Resource Block (PRB)) (starting PRB index) from which PUCCH allocation is started.

The number of PRBs to be assigned to a PUCCH

Information (frequency hopping information) indicating whether or not to enable frequency hopping with respect to a PUCCH An index of a frequency resource (frequency resource index) of a second hop in a case where frequency hopping is enabled An index of an initial Cyclic Shift (CS) (initial CS index)

An index of an orthogonal spreading code (e.g., OCC: Orthogonal Cover Code) in the time-domain or the length of the OCC (also referred to as, for example, an OCC length or a spreading factor) used for block-wise spreading before Discrete Fourier Transform (DFT)

An index of the OCC used for block-wise spreading after DFT

When the PUCCH resource sets #0 to #3 are configured to the user terminal as illustrated in FIG. 1, the user terminal selects one of the PUCCH resource sets based on a UCI payload size.

When, for example, the UCI payload size is 1 or 2 bits, the PUCCH resource set #0 is selected. Furthermore, when the UCI payload size is 3 bits or more and $N_2-1$ bits or less, the PUCCH resource set #1 is selected. Furthermore, when the UCI payload size is $N_2$ bits or more and $N_3-1$ bits or less, the PUCCH resource set #2 is selected. Similarly, when the UCI payload size is $N_3$ bits or more and $N_3-1$ bits or less, the PUCCH resource set #3 is selected.

Thus, a range of the UCI payload size for selecting a PUCCH resource set #i (i=0, . . . , K−1) is indicated as $N_i$ bits or more and $N_{i+1}-1$ bits or less (i.e., $\{N_i, \ldots, N_{i+1}-1\}$ bits).

In this regard, start positions (the numbers of start bits) $N_0$ and $N_1$ of UCI payload sizes for the PUCCH resource sets #0 and #1 may be 1 and 3, respectively. Thus, the PUCCH resource set #0 is selected when UCI up to 2 bits is transmitted. Therefore, the PUCCH resource set #0 may include the PUCCH resources #0 to #M−1 for at least one of the PF 0 and the PF 1. On the other hand, one of the PUCCH resource sets #1 to #3 is selected when UCI more than 2 bits is transmitted. Therefore, the PUCCH resource sets #1 to #3 may include the PUCCH resources #0 to #M−1 for at least one of the PF 2, the PF 3 and the PF 1, respectively.

In a case of i=2, . . . , K−1, information (start position information) indicating a start position ($N_i$) of a UCI payload size for the PUCCH resource set #i may be notified (configured) to the user terminal by using a higher layer signaling. The start position ($N_i$) may be specific to the user terminal. For example, the start position ($N_i$) may be configured to a value (e.g., a multiple of 4) in a range equal to or more than 4 bits and equal to or less than 256 bits. For example, in FIG. 1, information indicating start positions ($N_2$ and $N_3$) of UCI payload sizes for the PUCCH resource sets #2 and #3 is each notified to the user terminal by a higher layer signaling (e.g., user-specific RRC signaling).

A maximum UCI payload size of each PUCCH resource set is given according to $N_K-1$. $N_K$ may be explicitly notified (configured) to the user terminal by a higher layer signaling and/or DCI, or may be implicitly derived. For example, in FIG. 1, $N_0=1$ and $N_1=3$ may be defined by a specification, and $N_2$ and $N_3$ may be notified by a higher layer signaling. Furthermore, $N_4$ may be defined by the specification (e.g., $N_4=1000$).

In the case illustrated in FIG. 1, the user terminal can determine a single PUCCH resource used for transmission of UCI based on an indicator indicated by a first field value in DCI from the PUCCH resources #0 to #M−1 included in the PUCCH resource set selected based on the UCI payload size. The indicator indicated by the first field value may be referred to as, for example, a resource indicator, a PUCCH resource indicator, an ACK/NACK resource indicator (ARI: ACK/NACK Resource Indicator) and an ACK/NACK resource offset (ARO: ACK/NACK Resource offset).

On the other hand, it is also assumed that each PUCCH resource set includes a larger number of PUCCH resources (e.g., an Xth power of M>2 in a case where the given field is X bits) than a number that can be indicated by the above first field value. In this case, the user terminal may determine PUCCH resources used for transmission of UCI based on a combination of the above first field value and an implicit value. When, for example, a combination of a given field value of the X bits and an implicit value of Y bits is used, it is possible to indicate PUCCH resources that are a (X+Y)th power of 2.

The implicit value may be derived based on at least one of, for example, a Control Resource Element (CCE) index, a Control Resource Set (CORESET) index, a search space index, a Transmission Configuration Indicator (TCI) state (TCI state), the number of bits of HARQ-ACK, configuration information of a Demodulation Reference Signal (DMRS), the number of bits of the UCI and a codebook type for the HARQ-ACK.

Furthermore, the implicit value may be derived based on a second field value (e.g., a field indicating a TPC command) in DCI. In this case, the user terminal may determine PUCCH resources by using DCI (first DCI or a first PDCCH) including the above first field value, and DCI (second DCI or a second PDCCH) including the above second field value.

FIG. 2 is a diagram illustrating one example of determination of PUCCH resources. In FIG. 2, the user terminal determines the PUCCH resources based on a PUCCH resource indicator indicated by the first field value in the first DCI, and an implicit value indicated by the second field value in the second DCI.

In addition, when there is not the second DCI (when there is only the first DC), the user terminal may determine the PUCCH resources based on the PUCCH resource indicator indicated by the first field value in the first DCI assuming that each implicit value is a fixed value (e.g., "0").

However, there is a risk that, when the PUCCH resources are determined based on the combination of the PUCCH resource indicator and the implicit value as described above, the PUCCH resources used for transmission of UCI cannot be flexibly controlled.

When, for example, the PUCCH resource indicator indicated by the 2-bit first field value and the 1-bit implicit value are used as illustrated in FIG. 2, eight PUCCH resources can be dynamically indicated specifically to the user terminal. On the other hand, when PUCCH resources the number of which is larger than eight can be indicated specifically to the user terminal, it is possible to reduce a probability of contention of the PUCCH resources used for transmission of UCI, so that it is possible to perform more flexible control.

By the way, the 1-bit implicit value (0 or 1) is used in FIG. 2, and therefore 1 bit of the 2-bit second field is unused. Hence, the inventors of this application have conceived using an unused bit of the second field bit as an implicit value (second implicit value) different from the above implicit value (first implicit value), and thereby more flexibly controlling PUCCH resources used for transmission of UCI.

The present embodiment will be described in detail below. In this regard, in the following description, each PUCCH resource in each PUCCH resource set is explicitly notified (configured) from the radio base station to the user terminal by a higher layer signaling, yet is not limited to this. For example, at least one PUCCH resource in at least one PUCCH resource set may be defined in advance by the specification, or may be derived by the user terminal. Furthermore, the UCI may include at least one of HARQ-ACK, an SR and CSI.

Furthermore, the following description will exemplify the first and second implicit values indicated by the second field value in the second DCI, yet is not limited to this. PUCCH resources may be determined based on another implicit value in addition to or instead of the first and second implicit values. The another implicit value may be derived based on at least one of, for example, a CCE index, a CORESET index, a search space index, a TCI state, the number of bits of HARQ-ACK, configuration information of a DMRS, the number of bits of the UCI and a codebook type for the HARQ-ACK.

(First Aspect)

The first aspect will describe a determination example of PUCCH resources based on a PUCCH resource indicator (also referred to as, for example, a resource indicator, an ARI or an ARO, or simply as an indicator) indicated by a first field value in first DCI, and a first implicit value and a second implicit value indicated by a second field value of second DCI.

First Determination Example

FIG. 3 is a diagram illustrating one example of determination of PUCCH resources according to the first aspect. FIG. 3 differs from FIG. 2 in that the second field value in the second DCI is associated with the first and second implicit values. A difference from the determination example of the PUCCH resources in FIG. 2 will be mainly described below.

In FIG. 3, a user terminal may determine PUCCH resources (resources) used for transmission of UCI from a PUCCH resource set (resource set) configured by a higher layer signaling based on the PUCCH resource indicator indicated by the first field value in the first DCI, and the first implicit value indicated by the second field value in the second DCI.

The user terminal may determine whether or not to give a given offset to the above determined PUCCH resources based on the second implicit value indicated by the second field value in the second DCI.

When, for example, the second implicit value is "0" in FIG. 3, the user terminal transmits UCI by using the PUCCH resources without giving the given offset to the PUCCH resources determined based on the above PUCCH resource indicator and the above first implicit value.

On the other hand, when the second implicit value is "1", the user terminal gives the given offset to the PUCCH resources determined based on the above PUCCH resource indicator and the above first implicit value. The user terminal transmits the UCI by using the PUCCH resources to which the given offset has been given. In addition, control of PUCCH resources that uses the given offset will be described in the second aspect.

In addition, in FIG. 3, "first DCI (first PDCCH)" and "second DCI (second PDCCH)" only need to be a plurality of pieces of DCI whose at least one of a frequency-domain (e.g., a cell or a Component Carrier (CC)) and the time-domain (e.g., slot) differs.

When, for example, a plurality of pieces of DCI whose at least frequency-domain is different are detected by the user terminal, the "first DCI" may be DCI for a Primary Cell (PCell), and the "second DCI" may be DCI for a Secondary Cell (SCell). When a plurality of SCells are configured to the user terminal, the "second DCI" may be an SCell that has a minimum CC index.

On the other hand, when a plurality of pieces of DCI whose frequency-domain is identical (a single cell or only the PCell), and whose time-domain (e.g., slot) is different are detected by the user terminal, the user terminal may determine PUCCH resources based on the PUCCH resource indicator indicated by the first field value in the "first DCI" without using the "second DCI". More specifically, the user terminal may determine the PUCCH resources based on the above PUCCH resource indicator assuming that the first and second implicit values are each a fixed value (e.g., "0").

Second Determination Example

According to the second determination example, based on a number of PUCCH resources M in a PUCCH resource set, the user terminal decides whether or not to determine PUCCH resources based on the above second implicit value.

More specifically, when the above number of PUCCH resources M is smaller than a given threshold (e.g., 8), the user terminal may determine the PUCCH resources without being based on the above second implicit value. In this case, the user terminal transmits UCI by using the PUCCH resources determined based on the PUCCH resource indicator and the first implicit value illustrated in FIG. 3.

On the other hand, when the above number of PUCCH resources M is equal to the given threshold (e.g., 8), the user terminal may determine the PUCCH resources based on the above second implicit value. In this case, as described in the first determination example, the user terminal may determine, based on the second implicit value, whether or not to give a given offset to the PUCCH resources determined based on the PUCCH resource indicator and the first implicit value.

As described above, according to the first aspect, when an indication is made by the second implicit value, the given offset is given to the PUCCH resources determined based on the PUCCH resource indicator and the first implicit value. Consequently, it is possible to increase the number of PUCCH resources that can be dynamically indicated to the user terminal, and reduce a probability of contention of the PUCCH resources between user terminals. Furthermore, it is possible to more flexibly control the PUCCH resources.

(Second Aspect)

The second aspect will describe control of PUCCH resources that uses a given offset. As described above, each PUCCH resource configured to a user terminal by a higher layer signaling may include at least one of an initial CS index, a starting PRB index, a frequency resource index of a second hop, frequency hopping information indicating whether or not to enable frequency hopping, an OCC length used for block-wise spreading before DFT, a PUCCH starting symbol and the number of PUCCH symbols.

According to the second aspect, when an indication is made by the second implicit value (when, for example, the second implicit value is "1"), the user terminal gives a given offset $\alpha$ to at least one of these parameters. The given offset $\alpha$ may be defined in advance by a specification, or may be notified (configured) from a radio base station to the user terminal by a higher layer signaling.

<Initial CS Index>

When, for example, an indication is made by the second implicit value, the user terminal may give a given offset to an initial CS index in PUCCH resources determined based on a PUCCH resource indicator and a first implicit value.

Figure 4:
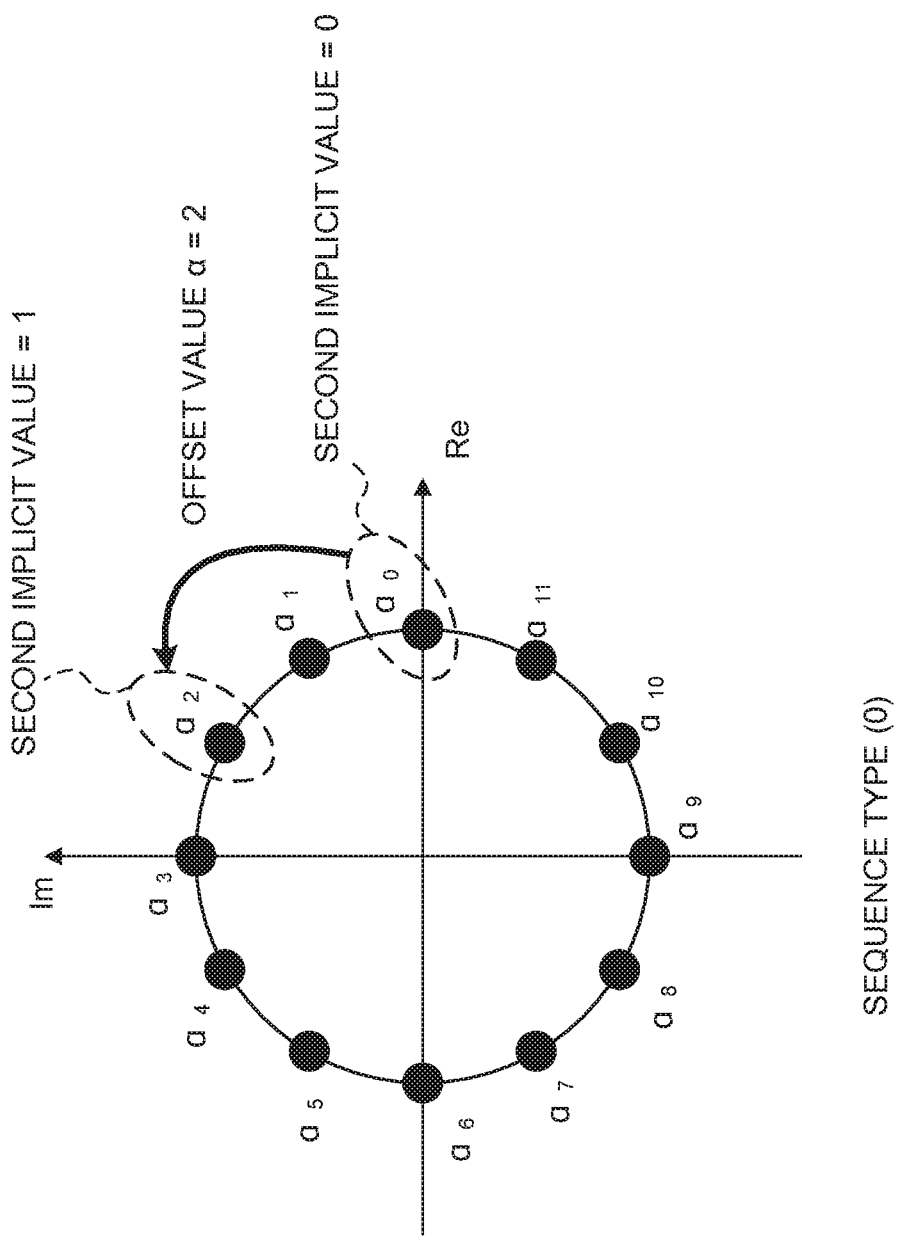
FIG. 4 is a diagram illustrating one example of a given offset according to a second aspect.

FIG. 4 is a diagram illustrating one example of the given offset according to the second aspect. FIG. 4 illustrates 12 types of phase rotation amounts $\alpha 0$ to $\alpha 11$. However, the types of the phase rotation amounts are not limited to those in FIG. 4. In FIG. 4, the phase rotation amounts $\alpha 0$ to $\alpha 11$ are identified based on given indices (e.g., initial CS indices).

In FIG. 4, when, for example, the second implicit value is "0", an initial CS index #0 in PUCCH resources determined based on the PUCCH resource indicator and the first implicit value indicates the phase rotation amount $\alpha 0$.

When the second implicit value is "1", the user terminal may give the given offset $\alpha$ ($\alpha=2$ in this case) to the initial CS index (i.e., the initial CS index #0 indicating the phase rotation amount $\alpha 0$) in the above PUCCH resources.

More specifically, the user terminal may determine a new initial CS index based on the initial CS index (original initial CS index) in the above PUCCH resources, and the given offset $\alpha$. For example, the user terminal may determine the new initial CS index by using following equation (1).

New initial CS index=(original initial CS index+ offset $\alpha$)mod(number of initial CS index candidates).     (Equation 1)

For example, FIG. 4 illustrates the 12 types of the phase rotation amounts $\alpha 0$ to $\alpha 11$, and therefore the number of initial CS index candidates is 12. Furthermore, offset value $\alpha=2$ holds, and the original initial CS index is #0. In this case, a new initial CS index #2 indicating the phase rotation amount $\alpha 2$ is determined based on above equation (1).

In addition, the given offset value $\alpha$ may be defined in advance by the specification, or may be notified (configured) to the user terminal by a higher layer signaling.

<Starting PRB Index and Frequency Resource Index of Second Hop>

Furthermore, when an indication is made by the second implicit value, the user terminal may give a given offset to a starting PRB index and/or a frequency resource index of a second hop in the PUCCH resources determined based on the PUCCH resource indicator and the first implicit value.

Figure 5:
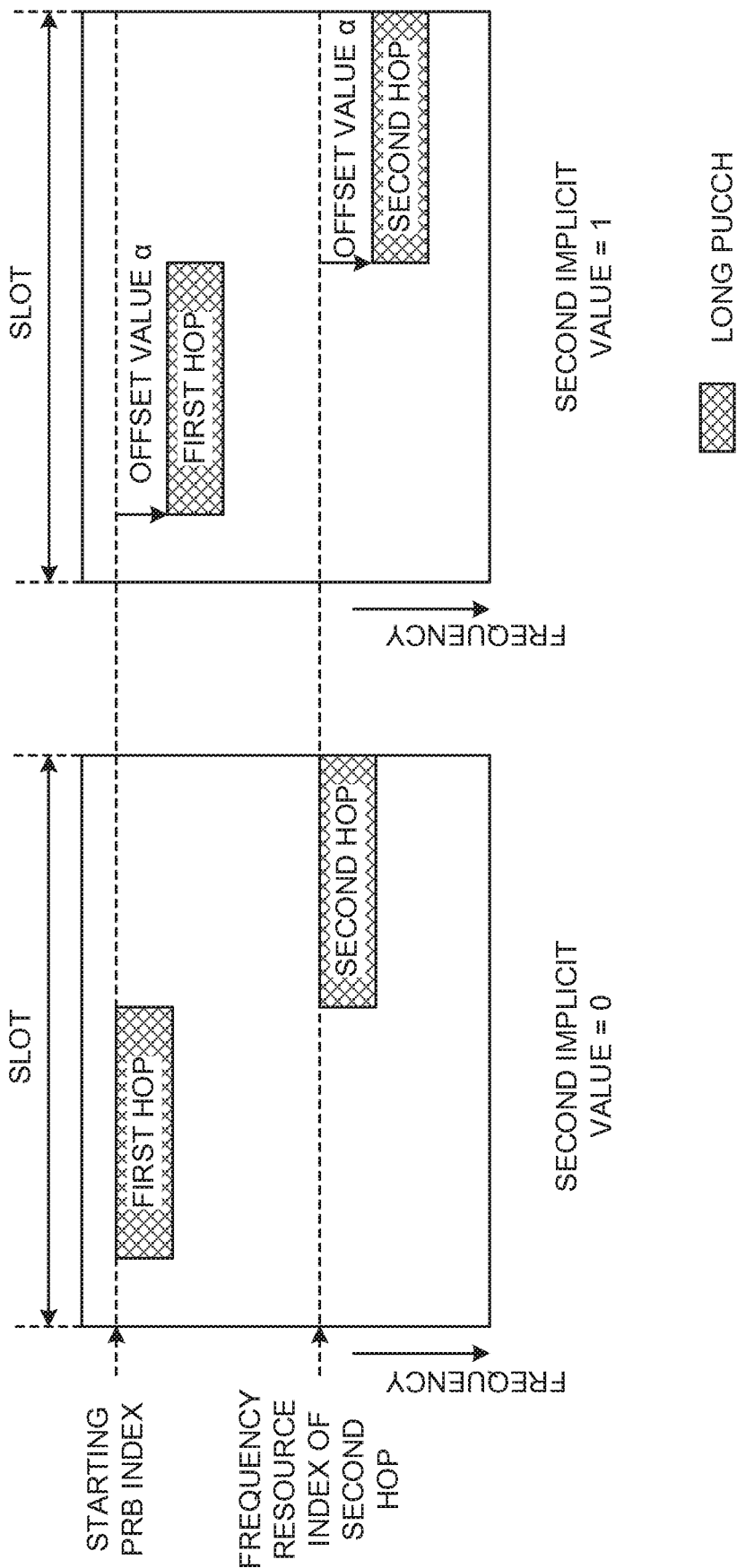
FIG. 5 is a diagram illustrating another example of a given offset according to the second aspect.

FIG. 5 is a diagram illustrating another example of the given offset value according to the second aspect. FIG. 5 illustrates the offset value α for starting PRB indices and frequency indices of the second hop of long PUCCHs (e.g., PFs 1, 3 and 4), yet is not limited to this. In addition, the offset value α may be applied to the starting PRB indices and/or the frequency resource indices of the second hop of short PUCCHs (e.g., PFs 0 and 2). Furthermore, frequency hopping may be disabled.

When, for example, the second implicit value is "0" in FIG. 5, the user terminal may determine PRBs assigned to a PUCCH of a first hop in a slot based on the starting PRB index in the PUCCH resources determined based on the PUCCH resource indicator and the first implicit value. Furthermore, the user terminal may determine PRBs assigned to a PUCCH of the second hop in the slot based on the frequency resource index of the second hop in the PUCCH resources.

Furthermore, when the second implicit value is "1", the user terminal may give the given offset α to the starting PRB index and the frequency resource index of the second hop in the PUCCH resources.

More specifically, the user terminal may determine a new starting PRB index based on the starting PRB index (original starting PRB index) in the above PUCCH resources, and the given offset α. For example, the user terminal may determine a new starting PRB index by using following equation (2).

New starting PRB index=(original starting PRB index+offset α)mod number of PRBs    (Equation 2)

Similarly, the user terminal may determine a new frequency resource index based on the frequency resource index (original frequency resource index) of the second hop in the above PUCCH resources, and the given offset α. For example, the user terminal may determine a new frequency resource index by using following equation (3).

New frequency resource index of second hop=(original frequency resource index+offset α)mod number of PRBs    (Equation 3)

In addition, the numbers of PRBs in equations (2) and (3) are the numbers of PRBs of a carrier (or a bandwidth part) configured to the user terminal, and may be, for example, 275. Furthermore, the given offset value α may be defined in advance by the specification, or may be notified (configured) to the user terminal by a higher layer signaling.

<Frequency Hopping Information>

Furthermore, when an indication is made by the second implicit value, the user terminal may give a given offset to frequency hopping information in PUCCH resources determined based on the PUCCH resource indicator and the first implicit value.

In this regard, the frequency hopping information indicates a binary value indicating whether or not to apply frequency hopping to PUCCHs (whether to enable or disable the frequency hopping). Therefore, giving the given offset to the frequency hopping information may refer to changing to another value α value of the frequency hopping information (i.e., the frequency hopping information subjected to a higher layer signaling) in the PUCCH resources determined as described above.

When, for example, the frequency hopping information (i.e., the frequency hopping subjected to a higher layer signaling) in the PUCCH resources determined as described above is a first value (enable), the user terminal assumes that the first value (enable) has been notified in a case where the second implicit value is "0", and may assume that a second value (disable) different from the first value (enable) has been notified in a case where the second implicit value is "1".

On the other hand, when the frequency hopping information (i.e., the frequency hopping information subjected to a higher layer signaling) in the PUCCH resources determined as described above is the second value (disable), the user terminal may assume that the second value (disable) has been notified in a case where the second implicit value is "0", and assume that the first value (enable) different from the second value (disable) has been notified in a case where the second implicit value is "1".

<OCC Length>

Furthermore, when an indication is made by the second implicit value, the user terminal may give a given offset to an OCC length in the PUCCH resources determined based on the PUCCH resource indicator and the first implicit value. In this regard, the OCC length may be may be referred to as an OCC multiplexing capacity, or may be referred to as a Spreading Factor (SF).

In this regard, the OCC length is assumed to take, for example, 2 types (e.g., "2" or "4") of values. Hence, giving the given offset to the OCC length may refer to changing to another value the value of the OCC length (i.e., the OCC length subjected to a higher layer signaling) in the PUCCH resources determined as described above.

When, for example, the OCC length (the OCC length subjected to a higher layer signaling) in the PUCCH resources determined as described above is the first value (e.g., "2"), the user terminal may assume that the first value has been notified in a case where the second implicit value is "0", and the second value (e.g., "4") different from the first value has been notified in a case where the second implicit value is "1". Consequently, it is possible to dynamically configure the OCC length by using the second implicit value.

On the other hand, when the OCC length (i.e., the OCC length subjected to a higher layer signaling) in the PUCCH resources determined as described above is the second value (e.g., "4"), the user terminal may assume that the second value has been notified in a case where the second implicit value is "0", and may assume that the first value (e.g., "2") different from the second value has been notified in a case where the second implicit value is "1". It is also possible to assume a case where the OCC length is not dynamically changed. Consequently, it is possible to dynamically configure resources other than the OCC length by using the second implicit value.

Alternatively, giving the given offset to the OCC length may refer to assuming that a fixed value (e.g., "2" or "4") has been notified irrespectively of whether the second implicit value is "0" or "1".

<Starting Symbol and Number of PUCCH Symbols>

Furthermore, when an indication is made by the second implicit value, the user terminal may give a given offset to the starting symbol index and/or the number of PUCCH symbols in the PUCCH resources determined based on the PUCCH resource indicator and the first implicit value.

When, for example, the second implicit value is "0", the user terminal may determine a duration (PUCCH duration) to which PUCCHs are allocated in a slot based on the starting symbol index and the number of PUCCH symbols in the slot in the PUCCH resources.

On the other hand, when the second implicit value is "1", the user terminal may give the given offset value α to the starting symbol index in the above PUCCH resources. More specifically, the user terminal may determine a new starting symbol index based on the starting symbol index (original starting symbol index) in the above PUCCH resources, and the given offset α. For example, the user terminal may determine a new starting symbol index by using following equation (4).

New starting symbol index=(original symbol index+ offset α)mod(number of symbols in slot)    (Equation 4)

Furthermore, when the second implicit value is "1", the user terminal may give the given offset α to the number of PUCCH symbols in the above PUCCH resources. More specifically, the user terminal may determine the number of new PUCCH symbols based on the number of PUCCH symbols (the number of original PUCCH symbols) in the above PUCCH resources, and the given offset α. For example, the user terminal may determine the number of new PUCCH symbols by using following equation (5).

Number of new PUCCH symbols=(number of original PUCCH symbols−offset α)mod (number of symbols in slot)    (Equation 5)

In addition, the numbers of symbols in slots in equations (4) and (5) may be, for example, 14. Furthermore, the given offset value α may be defined in advance by the specification, or may be notified (configured) to the user terminal by a higher layer signaling.

Even when the given offset α is given to the starting symbol index by determining the number of PUCCH symbols by using equation (5), it is possible to make an end symbol of the PUCCH in the slot the same as that in a case where the given offset α is not given.

As described above, according to the second aspect, when an indication is made by the second implicit value, it is possible to appropriately give the given offset to one or more parameters in the PUCCH resources.

(Third Aspect)

The third aspect will describe "first DCI (first PDCCH)" and "second DCI (second PDCCH)" according to the first and second aspects in detail.

The "first DCI (first PDCCH)" only needs to be DCI including a first field value that indicates the above PUCCH resource indicator, and the "second DCI (second PDCCH)" only needs to be DCI including a second field value that indicates first and second implicit values.

Furthermore, it is assumed hereinafter that the "first DCI (first PDCCH)" and the "second DCI (second PDCCH)" are a plurality of pieces of DCI whose at least one of a frequency-domain (e.g., a cell or a CC) and a time-domain (e.g., slot) is different. In addition, the "first DCI" and the "second DCI" are not limited to different pieces of DCI, and may be identical DCI that includes both of the above first field value and second field value.

FIGS. 6A and 6B illustrate cases where HARQ-ACK for PDSCHs transmitted in 1 slot and a plurality of cells is fed back. FIG. 6A illustrates the case where a codebook (semi-static codebook) of HARQ-ACK of a type 1 is configured to a user terminal, the number of cells (the number of CCs) in which a PDCCH and/or a PDSCH (PDCCH/PDSCH) are transmitted is larger than 1, and the number of slots in which the PDCCH/PDSCH are transmitted is 1.

In the case of FIG. 6A, the second field value in DCI for scheduling a PDSCH of a given cell (e.g., a PCell or a cell (CC) #0 of a minimum index) may indicate a TPC command.

Furthermore, in FIG. 6A, DCI for scheduling a PDSCH of a given cell (one or more SCells or at least one of cells #1 to #3) is the "second DCI", and the second field value in the DCI may indicate the first and second implicit values.

Furthermore, in FIG. 6A, DCI for scheduling a PDSCH of a given cell (e.g., the SCell or the cell #1 of a second minimum index) may be the "first DCI", and the first field value in the DCI may indicate the PDCCH resource indicator. In addition, the "first DCI" may be DCI for scheduling a PDSCH of the PCell (cell #0).

FIG. 6B illustrates the case where a codebook (dynamic codebook) of HARQ-ACK of a type 2 is configured to the user terminal, the number of cells (the number of CCs) in which a PDCCH and/or a PDSCH (PDCCH/PDSCH) are transmitted is larger than 1, and the number of slots in which the PDCCH/PDSCH are transmitted is 1.

A counter Downlink Assignment Indicator (Index) (DAI) and a total DAI in DCI transmitted in FIG. 6B are 1. In this regard, the counter DAI is information (count value) used to count scheduled PDSCHs. The total DAI is information indicating a total number of scheduled PDSCHs.

Similar to FIG. 6A, FIG. 6B assumes the "first DCI" and the "second DCI". In addition, the slot in FIG. 6A may be replaced with the counter DAI in FIG. 6B.

Figure 7A:
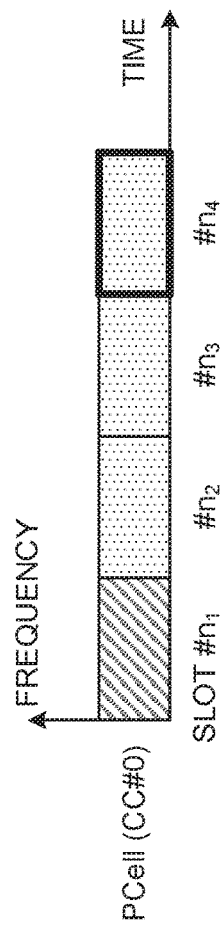
FIGS. 7A and 7B are diagrams illustrating a second example of the pieces of first and second DCI according to the third aspect.
Figure 7B:
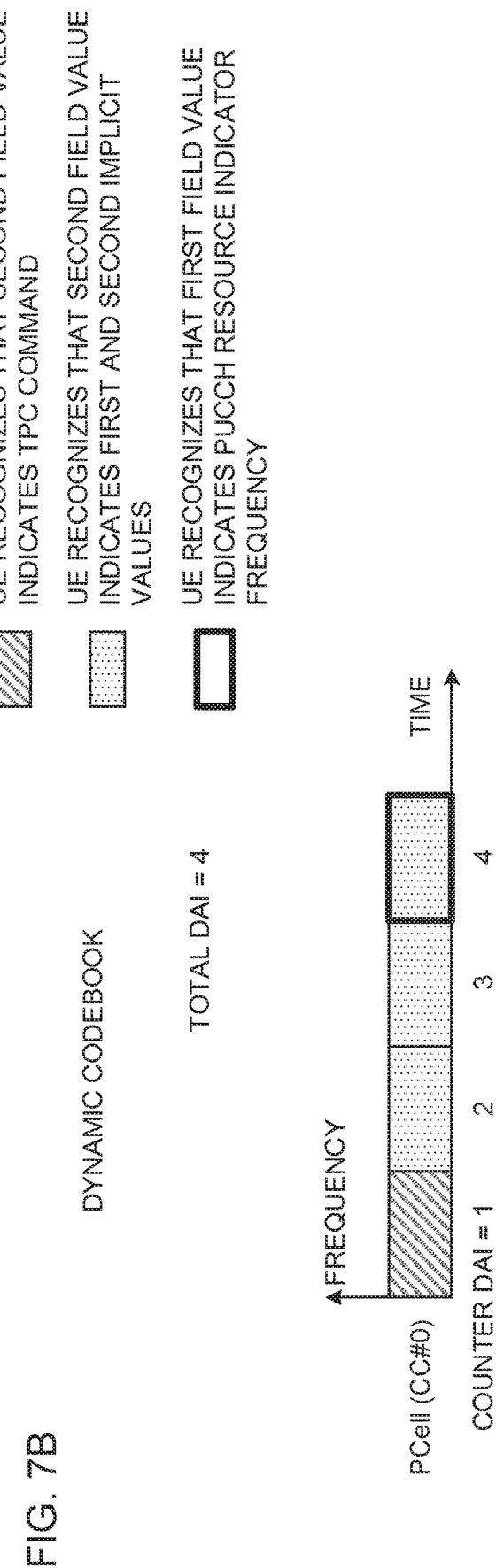

FIGS. 7A and 7B illustrate cases where HARQ-ACK for PDSCHs transmitted in a plurality of slots and 1 cell is fed back. FIG. 7A illustrates the case where the codebook (semi-static codebook) of the HARQ-ACK of the type 1 is configured to the user terminal, and the number of slots in which a PDCCH/PDSCH are transmitted is larger than 1.

In the case in FIG. 7A, the second field value in DCI for scheduling a PDSCH of a given slot (e.g., a slot $\#n_1$ of a minimum index) may indicate a TPC command.

Furthermore, in FIG. 7A, DCI for scheduling a PDSCH of a given slot (e.g., an immediate slot $\#n_4$) may be "first DCI", and the first field value in the DCI may indicate a PUCCH resource indicator.

Furthermore, in FIG. 7A, DCI for scheduling a PDSCH of a given slot (at least one of subsequent slots $\#n_2$ to $\#n_4$) may be "second DCI", and the second field value in the DCI may indicate the first and second implicit values.

In addition, in FIG. 7A, the second field values in the DCI of the subsequent slots $\#n_2$ to $\#n_4$ may indicate TPC commands. In this case, in FIG. 7A, there is not the "second DCI" including the second field value that indicates the first and second implicit values. The user terminal may assume that the first and second implicit values are fixed values (e.g., 0), and determine PUCCH resources based on the PUCCH resource indicator indicated by the first field value in the first DCI.

FIG. 7B illustrates the case where the codebook (dynamic codebook) of the HARQ-ACK of the type 2 is configured to the user terminal, and a total DAI in DCI is larger than 1. For example, the total DAI in the DCI transmitted in FIG. 7B is 4. Similar to FIG. 7A, FIG. 7B assumes the "first DCI" and the "second DCI". In addition, the slots in FIG. 7A may be replaced with counter DAIs in FIG. 7B.

FIGS. 8A and 8B illustrate cases where HARQ-ACK for PDSCHs transmitted in a plurality of slots and a plurality of cells is fed back. FIG. 8A illustrates the case where the codebook (semi-static codebook) of the HARQ-ACK of the type 1 is configured to the user terminal, the number of slots in which a PDCCH/PDSCH are transmitted is larger than 1, and the number of cells is also larger than 1.

In the case in FIG. 8A, DCI for scheduling the PDSCH of a given cell (e.g., a PCell or the cell #0 of a minimum index) and a given slot (e.g., the slot $\#n_1$ of a minimum index) may include a TPC command field value used for transmission power of the PUCCH.

Furthermore, in FIG. 8A, DCI for scheduling the PDSCH of a given cell (e.g., the PCell or the cell #0 of the minimum index) and the given slot (e.g., the immediate slot #$n_4$) may be the "first DCI", and the first field value in the DCI may indicate a PUCCH resource indicator.

Furthermore, in FIG. 8A, DCI for scheduling the PDSCH of a given cell (one or more SCells or at least one of the cells #1 to #3) and/or the given slot (at least one of the subsequent slots #$n_2$ to #$n_4$) may be the "second DCI", and include the TPC command field value that indicates the first and second implicit values.

In addition, FIG. 8A may illustrate that the second field values in the DCI of the subsequent slots #$n_2$ to #$n_4$ of the PCell indicate TPC commands. In this case, in FIG. 8A, the user terminal may assume that the first and second implicit values are fixed values (e.g., 0), or may determine PUCCH resources based on the first and second implicit values indicated by the second field value in DCI of the SCell.

FIG. 8B illustrates the case where the codebook (dynamic codebook) of the HARQ-ACK of the type 2 is configured to the user terminal, the total DAI in DCI is larger than 1, and the number of slots in which a PDCCH/PDSCH are transmitted is larger than 1. For example, a total DAI in the DCI transmitted in FIG. 8B is 4. Similar to FIG. 8A, FIG. 8B assumes the "first DCI" and the "second DCI". In this regard, the slots in FIG. 8A may be replaced with the counter DAIs in FIG. 8B.

FIGS. 9A and 9B illustrate cases where HARQ-ACK for a PDSCH transmitted in 1 slot and 1 cell is fed back. FIG. 9A illustrates the case where a codebook (semi-static codebook) of the HARQ-ACK of the type 1 is configured to the user terminal, and the number of cells (the number of CCs) and the number of slots in which a PDCCH and a PDSCH are transmitted are 1.

In the case in FIG. 9A, DCI for scheduling a PDSCH in a single cell and a slot may include a TPC command field value used for transmission power of a PUCCH. Furthermore, in FIG. 9A, the DCI may be the "first DCI", and the first field value in the DCI may indicate a PUCCH resource indicator.

On the other hand, in FIG. 9A, the second field value of the slot #$n_1$ and the PCell (cell #0) that is the "first DCI" indicates a TPC command, and therefore cannot be used to derive the first and second implicit values.

Thus, in FIG. 9A, there is not the "second DCI" including the second field value that indicates the first and second implicit values. Hence, the user terminal may assume that the first and second implicit values are each a fixed value (e.g., "0"), and determine PUCCH resources based on the PUCCH resource indicator indicated by the first field value in the "first DCI".

FIG. 9B illustrates the case where the codebook (dynamic codebook) of the HARQ-ACK of the type 2 is configured to the user terminal, and a counter DAI and a total DAI included in DCI for scheduling a PDSCH are 1. Similar to FIG. 9A, FIG. 9B assumes the "first DCI" and the "second DCI". In addition, the slot in FIG. 9A may be replaced with the counter DAI in FIG. 9B.

According to the third aspect, the user terminal can appropriately assume the first DCI including the first field value that indicates the PUCCH resource indicator, and the second DCI including the second field value that indicates the first and second implicit values.

(Radio Communication System)

The configuration of the radio communication system according to the present embodiment will be described below. This radio communication system is applied the radio communication method according to each of the above aspects. In addition, the radio communication method according to each of the above aspects may be applied alone or may be applied by combining at least two of the radio communication methods.

Figure 10:
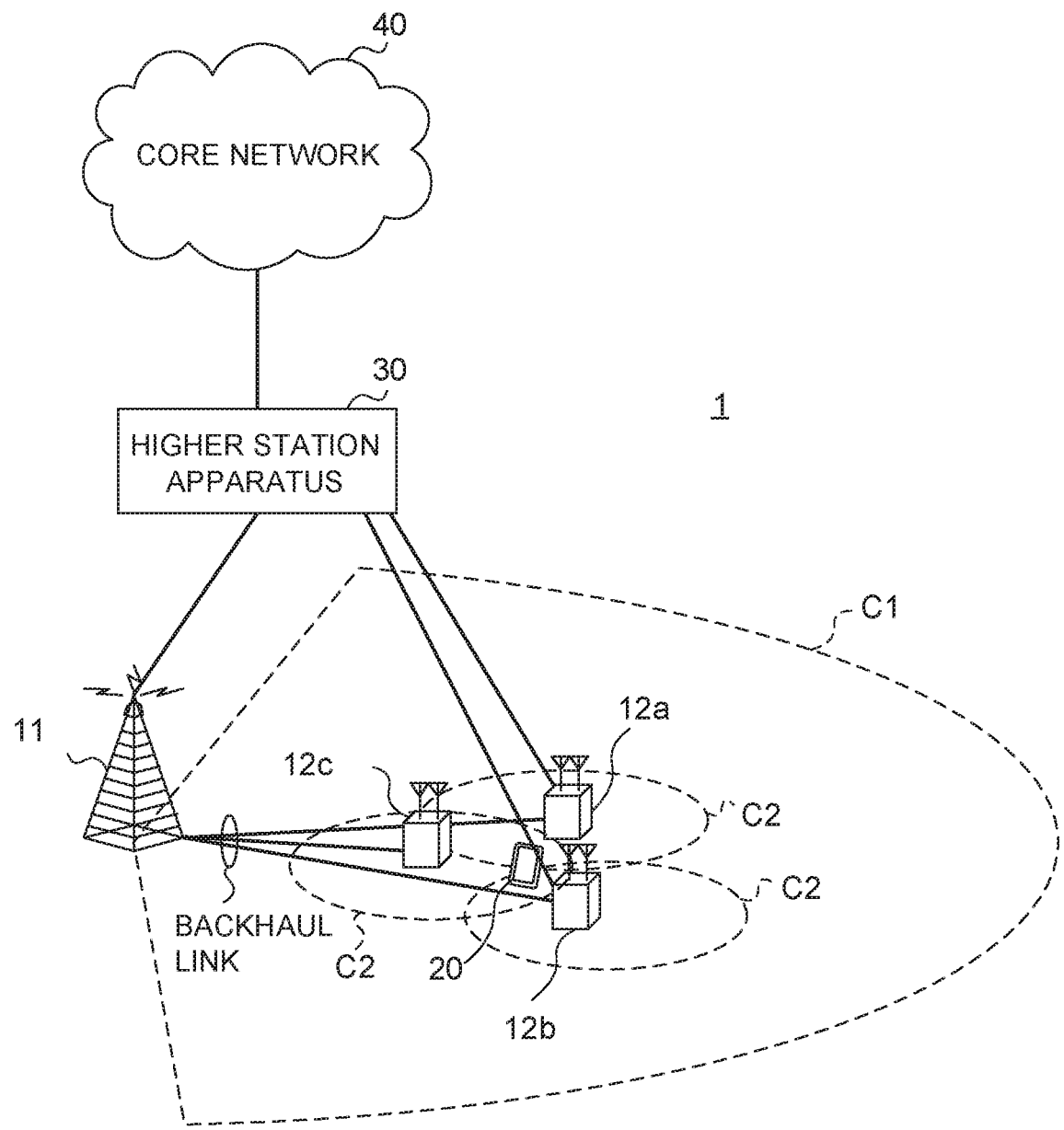
FIG. 10 is a diagram illustrating one example of a schematic configuration of a radio communication system according to the present embodiment.

FIG. 10 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) or a New Radio Access Technology (NR: New-RAT).

The radio communication system 1 illustrated in FIG. 10 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells and/or in the cells.

In addition, the numerology is a communication parameter (e.g., at least one of a spacing of a subcarrier (subcarrier-spacing), a bandwidth, a symbol length, a CP time duration (CP length), a subframe length, a TTI time duration (TTI length), the number of symbols per TTI, a radio frame configuration, filtering processing and windowing processing) in a frequency direction and/or a time direction. The radio communication system 1 may support subcarrier-spacings such as 15 kHz, 30 kHz, 60 kHz, 120 kHz and 240 kHz.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two CCs or more). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be each referred to as a TDD carrier (frame configuration type 2) and an FDD carrier (frame configuration type 1).

Furthermore, each cell (carrier) may be applied a single numerology or may be applied a plurality of different numerologies.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB), a gNodeB (gNB) or a transmission/reception point (TRP). Furthermore, each radio base station 12 is a radio base station that has a local coverage, and may be referred to as a small base station, a micro base station, a pico base station, a femto base station, a Home eNodeB (HeNB), a Remote Radio Head (RRH), an eNB, a gNB or a transmission/reception point. The radio base stations 11 and 12 will be collectively referred to as a radio base station 10 below when not distinguished.

Each user terminal 20 is a terminal that supports various communication schemes such as LTE, LTE-A, 5G and NR, and may include not only a mobile communication terminal but also a fixed communication terminal. Furthermore, the user terminal 20 can perform Device-to-Device communication (D2D) with the other user terminal 20.

The radio communication system 1 can apply Orthogonal Frequency-Division Multiple Access (OFDMA) to downlink (DL) and can apply Single Carrier-Frequency Division Multiple Access (SC-FDMA) to uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL.

Furthermore, the radio communication system 1 may use a multicarrier waveform (e.g., OFDM waveform), or may use a single carrier waveform (e.g., DFT-s-OFDM waveform).

The radio communication system 1 uses a DL shared channel (also referred to as, for example, a PDSCH: Physical Downlink Shared Channel or a DL data channel) shared by each user terminal 20, a broadcast channel (PBCH: Physical Broadcast Channel) and an L1/L2 control channel as DL channels. User data, higher layer control information and System Information Blocks (SIBs) are conveyed on the PDSCH. Furthermore, Master Information Blocks (MIBs) are conveyed on the PBCH.

The L1/L2 control channel includes a DL control channel (a Physical Downlink Control Channel (PDCCH) and an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. The EPDCCH is subjected to frequency division multiplexing with the PDSCH and is used to convey DCI similar to the PDCCH. Retransmission control information of HARQ (ACK/NACK) for the PUSCH can be conveyed on at least one of the PHICH, the PDCCH and the EPDCCH.

The radio communication system 1 uses a UL shared channel (also referred to as, for example, a PUSCH: Physical Uplink Shared Channel or a UL shared channel) shared by each user terminal 20, an uplink control channel (PUCCH: Physical Uplink Control Channel), and a random access channel (PRACH: Physical Random Access Channel) as UL channels. User data and higher layer control information are conveyed on the PUSCH. Uplink Control Information (UCI) including at least one of retransmission control information (A/N) and Channel State Information (CSI) of the DL signal is conveyed on the PUSCH or the PUCCH. A random access preamble for establishing connection with a cell can be conveyed on the PRACH.

<Radio Base Station>

Figure 11:
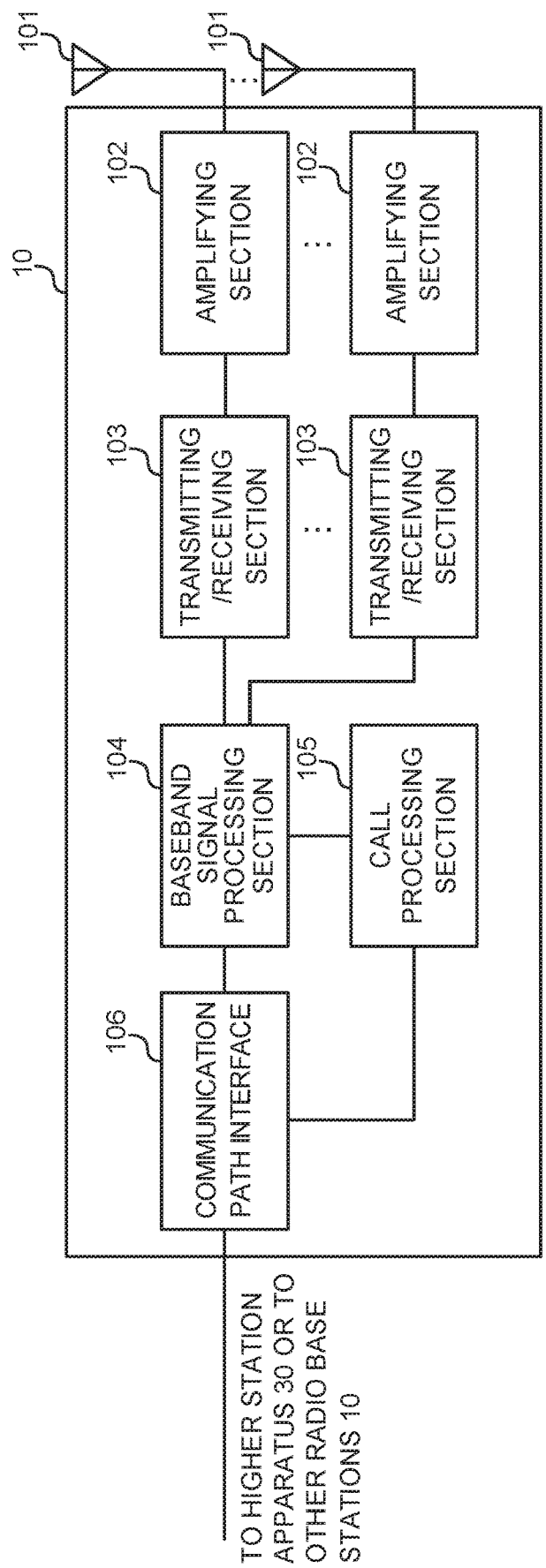
FIG. 11 is a diagram illustrating one example of an overall configuration of a radio base station according to the present embodiment.

FIG. 11 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 may be configured to include one or more of each of the transmission/reception antennas 101, the amplifying sections 102 and the transmission/reception sections 103.

User data transmitted from the radio base station 10 to the user terminal 20 on DL is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARQ) transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as a UL signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on UL data included in the input UL signal, and transfers the UL data to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmission section/reception section 103 transmits a DL signal (including at least one of a DL data signal, a DL control signal and a DL reference signal) to the user terminal 20, and receives a UL signal (including at least one of a UL data signal, a UL control signal and a UL reference signal) from the user terminal 20.

Furthermore, each transmission/reception section 103 receives UCI from the user terminal 20 by using an uplink shared channel (e.g., PUSCH) or an uplink control channel (e.g., a short PUCCH and/or a long PUCCH). The UCI may include at least one of HARQ-ACK of a DL data channel (e.g., PDSCH), CSI, an SR, beam identification information (e.g., Beam Index (BI)) and a Buffer Status Report (BSR).

Furthermore, each transmission/reception section 103 may transmit one or more pieces of DCI by using one or more downlink control channels. For example, each transmission/reception section 103 may transmit first DCI (first PDCCH) and second DCI (second PDCCH).

Figure 12:
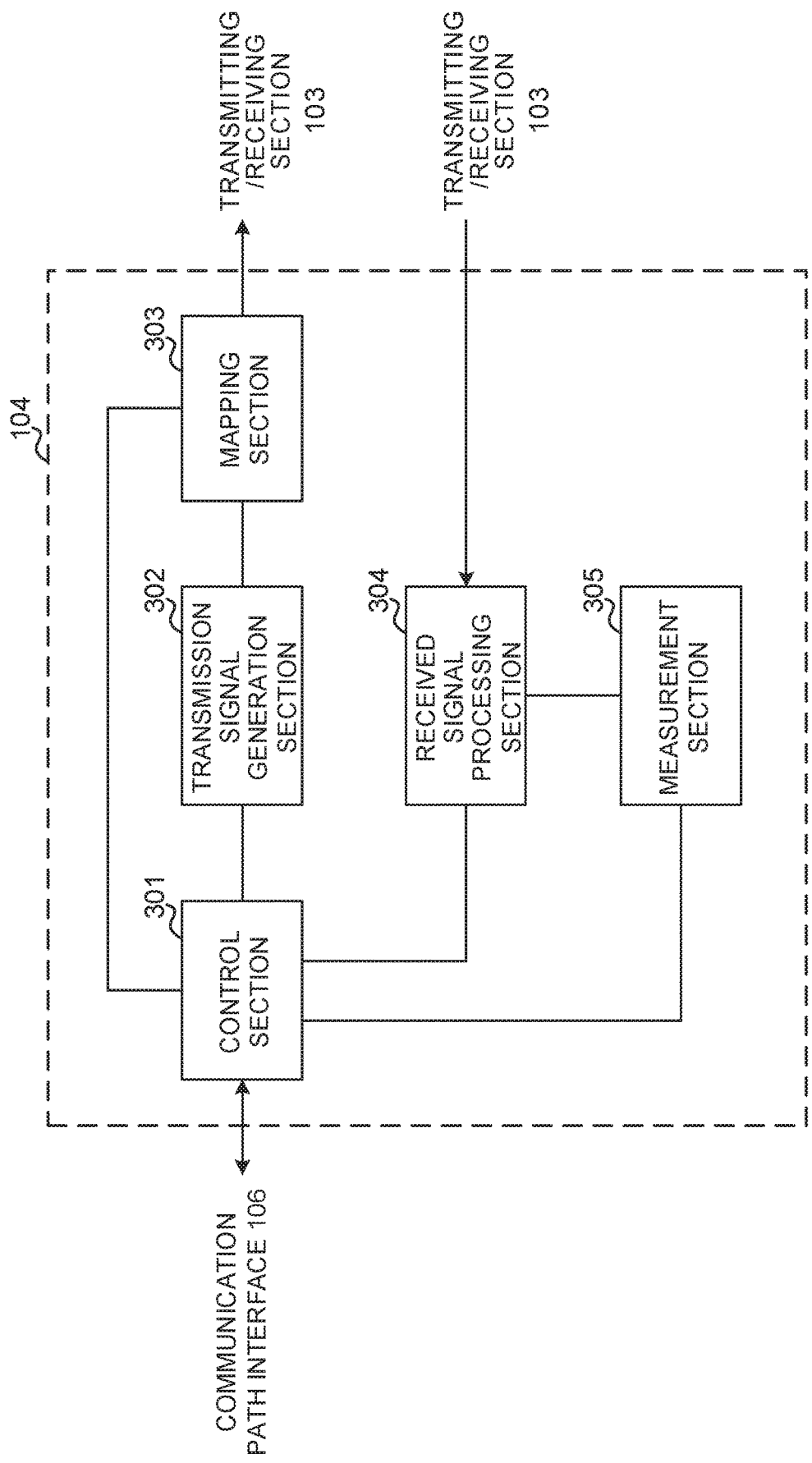
FIG. 12 is a diagram illustrating one example of a function configuration of the radio base station according to the present embodiment.

FIG. 12 is a diagram illustrating one example of a function configuration of the radio base station according to the present embodiment. In addition, FIG. 12 mainly illustrates function blocks of characteristic portions according to the present embodiment, and assumes that the radio base station 10 includes other function blocks, too, that are necessary for radio communication. As illustrated in FIG. 12, the baseband signal processing section 104 includes a control section 301, a transmission signal generating section 302, a mapping section 303, a received signal processing section 304 and a measurement section 305.

The control section 301 controls the entire radio base station 10. The control section 301 controls, for example, DL signal generation of the transmission signal generating section 302, DL signal mapping of the mapping section 303, UL signal reception processing (e.g., demodulation) of the received signal processing section 304, and measurement of the measurement section 305.

More specifically, the control section 301 schedules the user terminal 20. More specifically, the control section 301 may perform scheduling and/or retransmission control on the DL data and/or the uplink shared channel based on the UCI (e.g., the CSI and/or the BI) from the user terminal 20.

Furthermore, the control section 301 may control a configuration (format) of the uplink control channel (e.g., the long PUCCH and/or the short PUCCH), and perform control to transmit control information related to the uplink control channel.

Furthermore, the control section 301 may control a PUCCH resource configuration. More specifically, the control section 301 may perform control to configure K PUCCH resource sets each including M PUCCH resources to the user terminal based on a UCI payload size.

Furthermore, the control section 301 may control reception processing of UCI that uses the PUCCH resources determined based on a given field value and/or implicit values in DCI in the user terminal. The control section 301 may control blind detection of the PUCCH resources.

The control section 301 may control the received signal processing section 304 to perform the reception processing of the UCI from the user terminal 20 based on the uplink control channel format.

The control section 301 can be composed of a controller, a control circuit or a control apparatus described based on the common knowledge in the technical field according to the present invention.

The transmission signal generating section 302 generates a DL signal (including a DL data signal, a DL control signal or a DL reference signal) based on an indication from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on given radio resources based on the indication from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal and a UL reference signal) transmitted from the user terminal 20. More specifically, the received signal processing section 304 may output a received signal and a signal after the reception processing to the measurement section 305. Furthermore, the received signal processing section 304 performs UCI reception processing based on an uplink control channel configuration indicated by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 13:
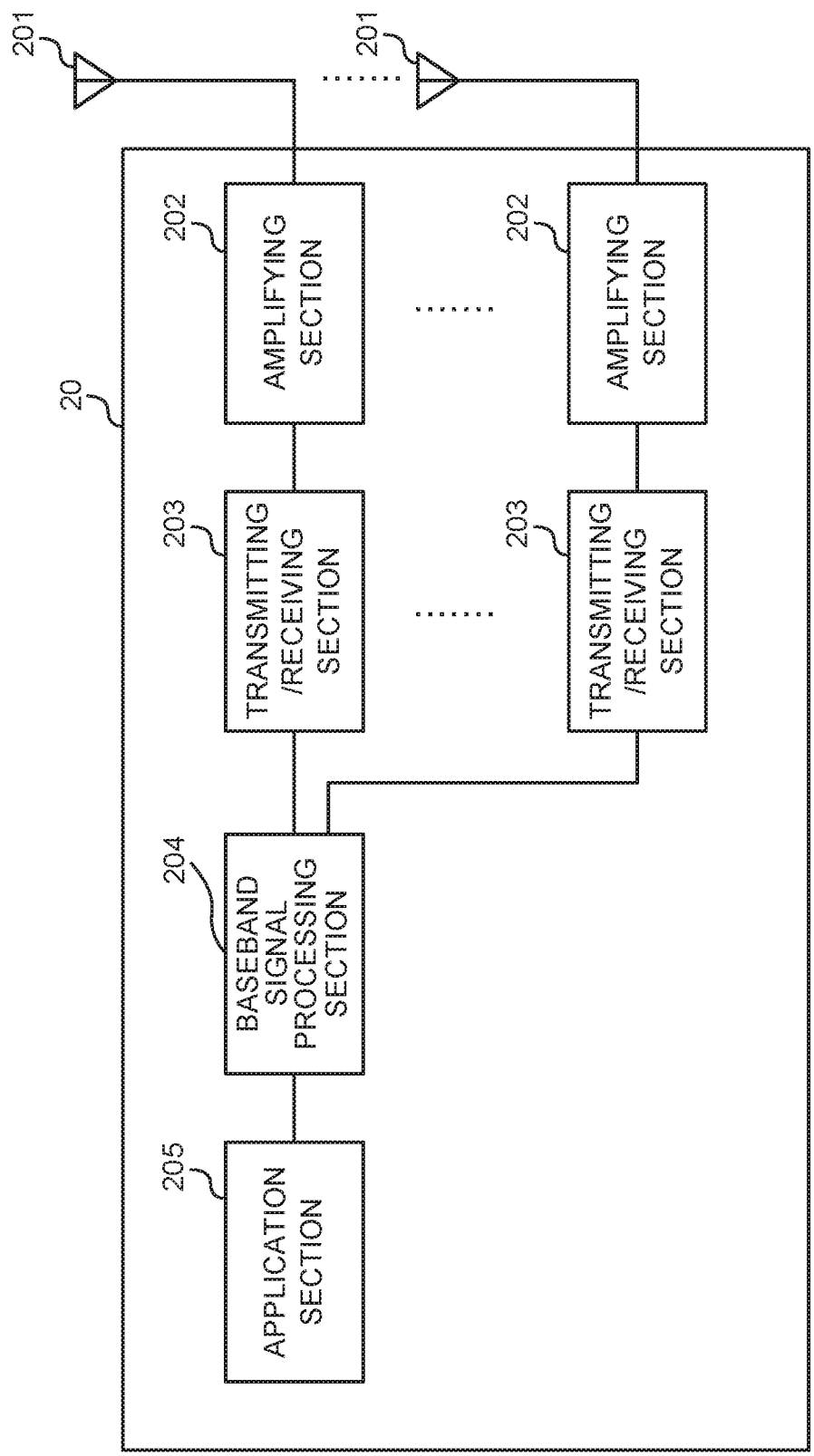
FIG. 13 is a diagram illustrating one example of an overall configuration of a user terminal according to the present embodiment.

FIG. 13 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The respective amplifying sections 202 amplify radio frequency signals received at a plurality of transmission/reception antennas 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, and retransmission control reception processing on the input baseband signal. The baseband signal processing section 204 transfers DL data to the application section 205. The application section 205 performs processing related to layers higher than a physical layer and an MAC layer. Furthermore, the broadcast information is also transferred to the application section 205.

On the other hand, the application section 205 inputs UL data to the baseband signal processing section 204. The baseband signal processing section 204 performs retransmission control transmission processing (e.g., HARQ transmission processing), channel coding, rate matching, puncturing, Discrete Fourier Transform (DFT) processing and IFFT processing on the UL data, and transfers the UL data to each transmission/reception section 203. The baseband signal processing section 204 performs at least one of channel coding, rate matching, puncturing, DFT processing and IFFT processing on the UCI, too, and transfers the UCI to each transmission/reception section 203.

Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives DL signals (including a DL data signal, a DL control signal (DCI) and a DL reference signal) of numerologies configured to the user terminal 20, and transmits UL signals (including a UL data signal, a UL control signal and a UL reference signal) of the numerologies.

Furthermore, each transmission/reception section 203 transmits UCI to the radio base station 10 by using an uplink shared channel (e.g., PUSCH) or an uplink control channel (e.g., a short PUCCH and/or a long PUCCH).

Furthermore, each transmission/reception section 203 may receive information indicating K PUCCH resource sets that each include M PUCCH resources. Furthermore, each transmission/reception section 203 may receive higher layer control information (higher layer parameter).

Furthermore, each transmission/reception section 203 receives one or more pieces of DCI by using one or more downlink control channels. For example, each transmission/reception section 203 may receive first DCI (first PDCCH) and second DCI (second PDCCH).

The transmission/reception sections 203 can be composed as transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 14:
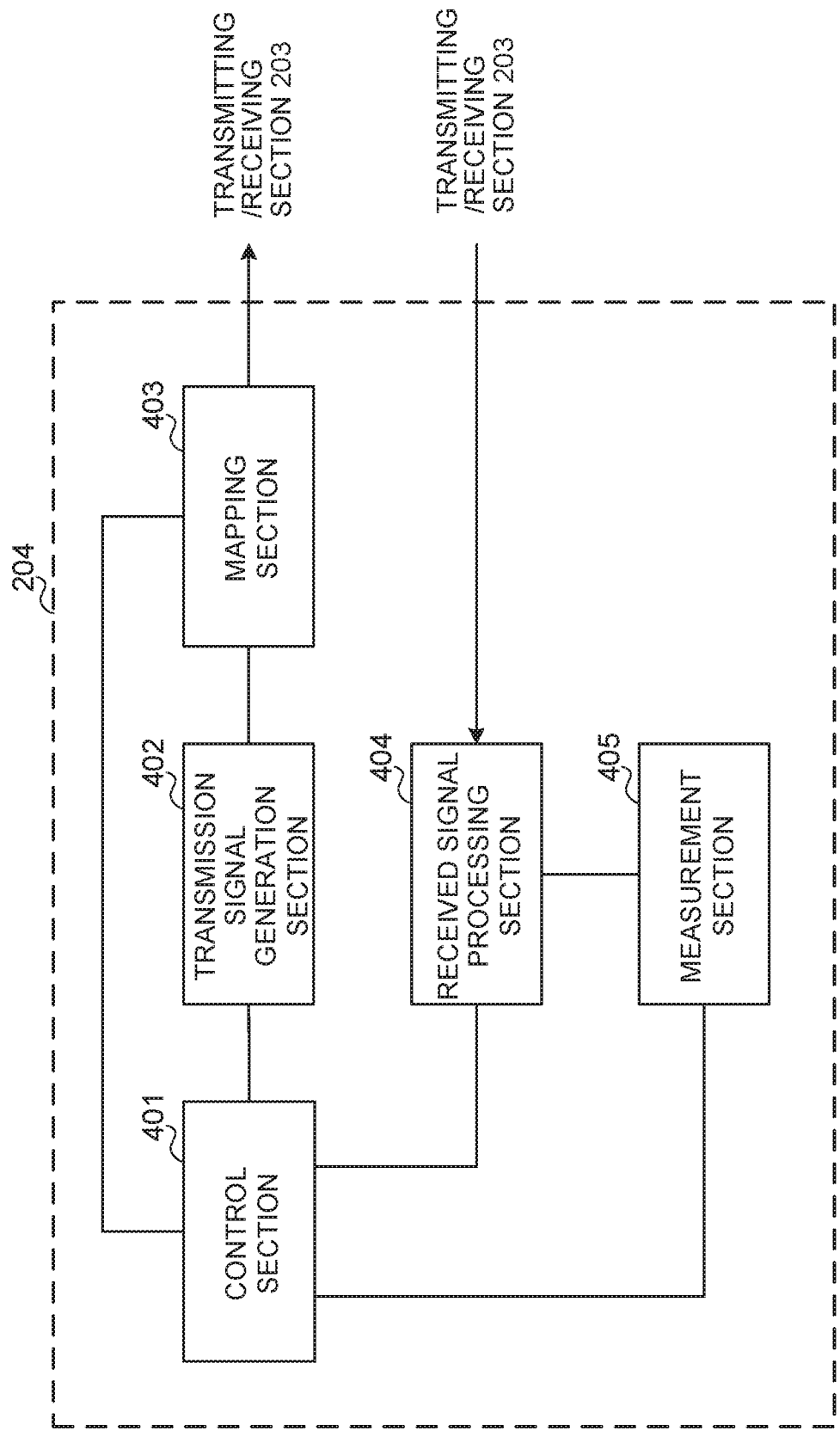
FIG. 14 is a diagram illustrating one example of a function configuration of the user terminal according to the present embodiment.

FIG. 14 is a diagram illustrating one example of a function configuration of the user terminal according to the present embodiment. In addition, FIG. 14 mainly illustrates function blocks of characteristic portions according to the present embodiment, and assumes that the user terminal 20 includes other function blocks, too, that are necessary for radio communication. As illustrated in FIG. 14, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls, for example, UL signal generation of the transmission signal generating section 402, UL signal mapping of the mapping section 403, DL signal reception processing of the received signal processing section 404 and measurement of the measurement section 405.

More specifically, the control section 401 may monitor downlink control channel candidate resources, and control detection of one or more pieces of DCI (e.g., the first DCI and the second DCI).

Furthermore, the control section 401 controls an uplink control channel used for transmission of UCI from the user terminal 20 based on an explicit indication from the radio base station 10 or implicit determination in the user terminal 20. Furthermore, the control section 401 controls transmission of the UCI.

Furthermore, the control section 401 may control the configuration (format) of the uplink control channel (e.g., a long PUCCH and/or a short PUCCH). The control section 401 may control the uplink control channel format based on control information from the radio base station 10.

Furthermore, the control section 401 may control the PUCCH format (the uplink control channel format) used for transmission of the UCI based on information related to fallback.

Furthermore, the control section 401 may determine PUCCH resources (resources) used for the transmission of the UCI based on a PUCCH resource indicator (resource indictor) indicated by the first field value in the first DCI, and the first implicit value and the second implicit value indicated by the second field value in the second DCI.

Furthermore, the control section 401 may determine the PUCCH resources used for the transmission of the UCI from PUCCH resource sets (resource sets) configured by a higher layer signaling based on the PUCCH resource indicator and the first implicit value (first aspect).

Furthermore, the control section 401 may determine whether or not to give a given offset to the PUCCH resources based on the second implicit value (the first aspect and the first determination example).

Furthermore, when the number of PUCCH resources included in the PUCCH resource set is equal to a given threshold, the control section 401 may determine whether or not to give the given offset to the resources based on the second implicit value (the first aspect and the second determination example).

Furthermore, when an indication is made by the second implicit value, the control section 401 may control the PUCCH resources determined based on the PUCCH resource indicator and the first implicit value by using the given offset (second aspect).

The PUCCH resources may include at least one of an initial cyclic shift index, a starting resource block index of the uplink control channel, a frequency resource index of a second hop, information indicating whether or not to apply frequency hopping to the uplink control channel, a length of an orthogonal cover code used for block-wise spreading before discrete Fourier transform, a starting symbol of the uplink control channel, and the number of symbols of the uplink control channel.

Furthermore, the control section 401 may assume the above first DCI and second DCI based on a given rule (third aspect).

Furthermore, when one or more resource sets (PUCCH resource sets) each including one or more resources (PUCCH resources) for the uplink control channel is configured, the control section 401 may determine resources used for the transmission of the UCI based on the given field value and implicit indication information in Downlink Control Information (DCI) from the resource set selected based on the number of bits of the UCI.

The control section 401 can be composed of a controller, a control circuit or a control apparatus described based on the common knowledge in the technical field according to the present invention.

The transmission signal generating section 402 generates (e.g., encodes, rate-matches, punctures and modulates) UL signals (including a UL data signal, a UL control signal, a UL reference signal and the UCI) based on an indication from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on radio resources based on the indication from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal or a DL reference signal). The received signal processing section 404 outputs information received from the radio base station 10 to the control section 401. The received signal processing section 404 outputs, for example, broadcast information, system information, higher layer control information of a higher layer signaling such as an RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 15:
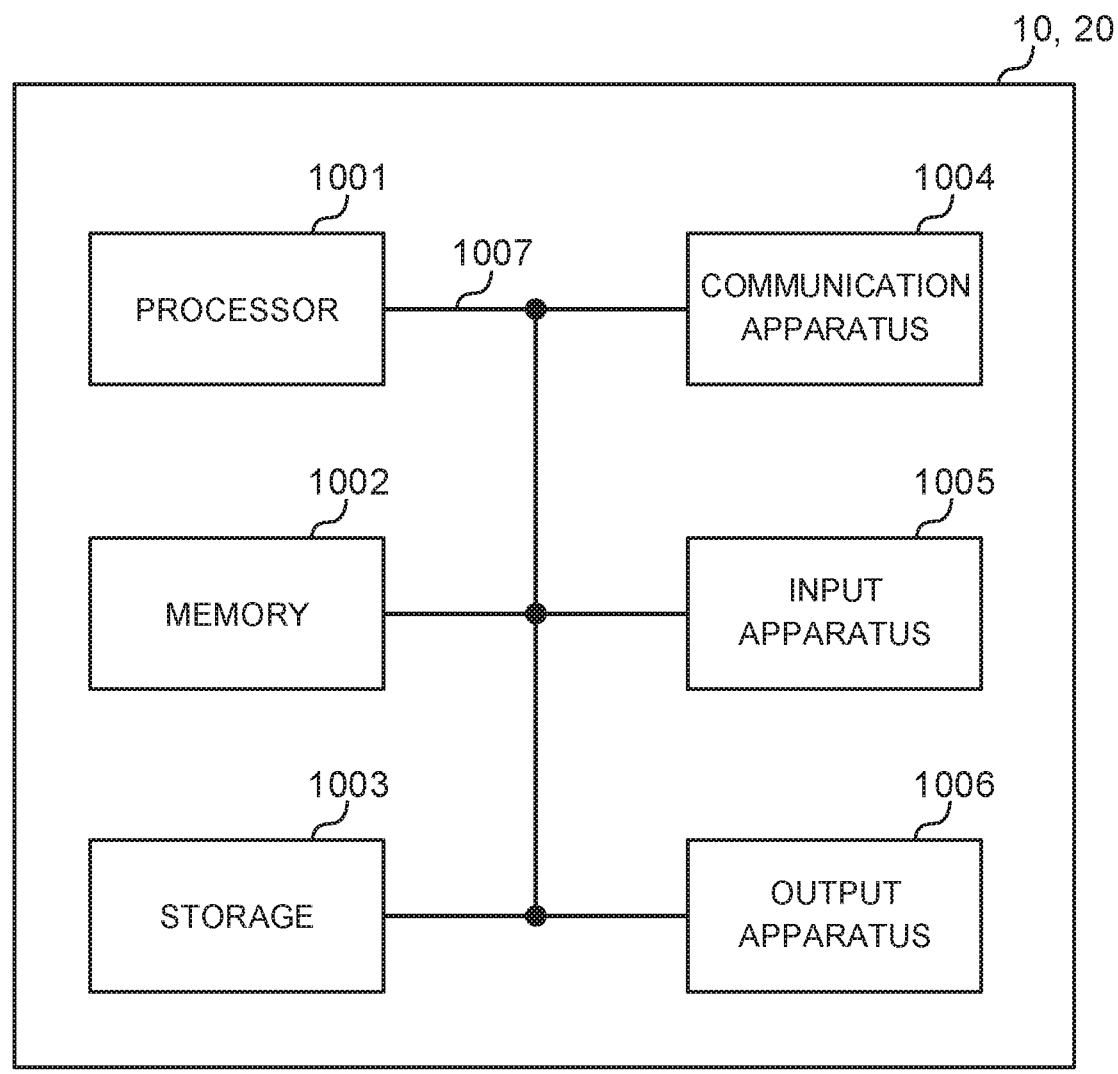
FIG. 15 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 15 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 15 or may be configured without including part of the apparatuses.

For example, FIG. 15 illustrates the only one processor 1001. However, there may be a plurality of processors. Furthermore, processing may be executed by 1 processor or processing may be executed by 1 or more processors concurrently, successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for assigning radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource assignment units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be indicated by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a transmission/reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus or a reception apparatus.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically, logically or by a combination of the physical and logical connections. For example, "connection" may be read as "access".

It can be understood that, when connected in this description, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
   a receiver that receives a downlink control information; and
   a processor that:
   determines a first parameter based on a control channel element (CCE) index and a field value included in the downlink control information;
   determines, based on the CCE index, whether a second parameter is the first parameter or a sum of the first parameter and an offset; and
   determines an initial cyclic shift index for a physical uplink control channel (PUCCH) transmission based on the second parameter.

2. The terminal according to claim 1, wherein the processor determines the initial cyclic shift index based on a modulo operation comprising the second parameter and a number of initial cyclic shift index candidates.

3. The terminal according to claim 1, wherein the processor determines a physical resource block index of the PUCCH transmission in a first hop and a physical resource block index of the PUCCH transmission in a second hop based on the second parameter.

4. The terminal according to claim 2, wherein the processor determines a physical resource block index of the PUCCH transmission in a first hop and a physical resource block index of the PUCCH transmission in a second hop based on the second parameter.

5. A communication method for a terminal comprising:
receiving a downlink control information;
determining a first parameter based on a control channel element (CCE) index and a field value included in the downlink control information;
determining, based on the CCE index, whether a second parameter is the first parameter or a sum of the first parameter and an offset; and
determining an initial cyclic shift index for a physical uplink control channel (PUCCH) transmission based on the second parameter.

6. A base station comprising:
a transmitter that transmits a downlink control information; and
a processor that controls receiving of a physical uplink control channel (PUCCH),
wherein a first parameter is determined based on a control channel element (CCE) index, and a field value included in the downlink control information; whether a second parameter is the first parameter or is a sum of the first parameter and an offset is determined based on the CCE index; and an initial cyclic shift index for the PUCCH is determined based on the second parameter.

7. A system comprising a terminal and a base station:
the terminal comprises:
a receiver that receives a downlink control information; and
a processor of the terminal that:
determines a first parameter based on a control channel element (CCE) index, and a field value included in the downlink control information;
determines, based on the CCE index, whether a second parameter is the first parameter or is a sum of the first parameter and an offset; and
determines an initial cyclic shift index for a physical uplink control channel (PUCCH) transmission based on the second parameter, and the base station comprises:
a transmitter that transmits the downlink control information; and
a processor of the base station that controls receiving of the PUCCH.

* * * * *